(12) United States Patent
Cohen et al.

(10) Patent No.: US 11,438,418 B2
(45) Date of Patent: Sep. 6, 2022

(54) METHOD AND SYSTEM FOR EQUIPMENT MONITORING AND CONTROLLING COLLECTED DATA

(71) Applicants: Jacques Cohen, Hudson, NY (US); Alex Bisignano, New York, NY (US); Stephen Fiser, Chicago, IL (US); Giles Tomkin, Wallace, NC (US)

(72) Inventors: Jacques Cohen, Hudson, NY (US); Alex Bisignano, New York, NY (US); Stephen Fiser, Chicago, IL (US); Giles Tomkin, Wallace, NC (US)

(*) Notice: Subject to any disclaimer, the term of this patent is extended or adjusted under 35 U.S.C. 154(b) by 436 days.

(21) Appl. No.: 16/189,248

(22) Filed: Nov. 13, 2018

(65) Prior Publication Data
US 2019/0149608 A1 May 16, 2019

Related U.S. Application Data

(60) Provisional application No. 62/585,228, filed on Nov. 13, 2017.

(51) Int. Cl.
| | | |
|---|---|---|
| *H04L 67/12* | (2022.01) | |
| *G01D 3/08* | (2006.01) | |
| *G08B 21/18* | (2006.01) | |
| *G06Q 10/00* | (2012.01) | |
| *G06Q 10/06* | (2012.01) | |
| *G06Q 10/08* | (2012.01) | |

(52) U.S. Cl.
CPC .............. *H04L 67/12* (2013.01); *G01D 3/08* (2013.01); *G06Q 10/063* (2013.01); *G06Q 10/0639* (2013.01); *G06Q 10/087* (2013.01); *G06Q 10/20* (2013.01); *G08B 21/182* (2013.01)

(58) Field of Classification Search
CPC ......... H04L 67/12; G08B 21/182; G01D 3/08
See application file for complete search history.

(56) References Cited

U.S. PATENT DOCUMENTS 7,774,211 B1 * 8/2010 Mullen .................. G06Q 10/10
705/2

* cited by examiner

*Primary Examiner* — Toan M Le
(74) *Attorney, Agent, or Firm* — Andrew Morabito

(57) ABSTRACT

The present invention is a method for monitoring equipment data including; identifying at least one group of equipment, compiling, at least one piece of equipment within the at least one group of equipment, wherein the at least one piece of equipment is based on the at least one group of equipment, assigning, at least one parameter for the at least one group of equipment, wherein the at least one parameter is applied to each of the at least one pieces of equipment within the at least one group of equipment, setting, a range of acceptable values for a first group of the at least one parameters, and receiving, at least one value associated with at least one piece of equipment of the at least one group of equipment.

18 Claims, 12 Drawing Sheets

METHOD AND SYSTEM FOR EQUIPMENT MONITORING AND CONTROLLING COLLECTED DATA

BACKGROUND

The present invention relates generally to the topics of equipment, facility, and process monitoring, and specifically to the tracking and data collection of completely customizable parameters which are arbitrary from the perspective of the system.

Laboratories, facilities, and departments all require tracking of instrument and equipment performance and data to test expected functions, protect the equipment, and the personnel as well as provide optimal performance in order to maintain excellence in the field of study. For instance, in clinical science laboratories, it is required to obtain licenses, and laboratories are periodically certified by health department (e.g. CLIA, CDC, NY State Health Department) or peer inspectors (CAP)). Such licenses are mandatory in the USA and other countries. An important part of licensure is proof of ongoing quality control of laboratory instruments. Daily or periodic records are kept on forms and parameters assessing performance (such as pH and temperature) are registered manually by licensed laboratory staff. These form records are usually kept in binders, which inspectors can check upon request. There is no or minimal electronic recordkeeping. Countless other businesses monitor various environmental and process-oriented parameters on a regular basis, and they also typically record data by simply writing it on paper and storing it in binders. A considerable loss of information may occur this way since records are not evaluated to assess performance over time and possible drift. Also, this form of record-keeping prevents any form of remote supervision. For example, with records kept in cloud-based databases, supervisors and inspectors can assess data remotely and run reports to verify laboratory recordkeeping. There is currently no way to capture data from equipment, environments, or standard procedures that is unknown to the application unless Excel or Excel-like programs are used. However, entry is cumbersome, and reporting is limited.

Monitoring the conditions of equipment is useful to make sure the equipment is operating with the desired ranges, that the equipment is functioning normally, but most importantly so that the test, process, or experiment is not affected in an unintended way. Some monitoring systems can be configured to set off an alarm when a sensor's reading crosses a given threshold or falls outside of the limits of some normal operating range. However, some of these systems provide no insight as to why the alarm condition was reached. For example, many existing temperature sensors are configured to raise an alarm or send an alert if the temperature crosses, or transgresses, a given threshold without considering factors such as the duration of the time outside the desired limits and the extent to which the temperature has changed beyond a threshold limit.

SUMMARY

In a first embodiment, the present invention is a method for monitoring equipment data comprising; identifying at least one group of equipment, compiling, at least one piece of equipment within the at least one group of equipment, wherein the at least one piece of equipment is based on the at least one group of equipment, assigning, at least one parameter for the at least one group of equipment, wherein the at least one parameter is applied to each of the at least one pieces of equipment within the at least one group of equipment, setting, a range of acceptable values for a first group of the at least one parameters, and receiving, at least one value associated with at least one piece of equipment of the at least one group of equipment.

In a second embodiment, the present invention is a computer program product for monitoring equipment data, the computer program product comprising: one or more computer readable storage media and program instructions stored on the one or more computer readable storage media, the program instructions comprising: program instructions to identify at least one group of equipment; program instructions to compile at least one piece of equipment within the at least one group of equipment, wherein the at least one piece of equipment is based on the at least one group of equipment; program instructions to assign at least one parameter for the at least one group of equipment, wherein the at least one parameter is applied to each of the at least one pieces of equipment within the at least one group of equipment; program instructions to set a range of acceptable values for a first group of the at least one parameter; and program instructions to receive at least one value associated with at least one piece of equipment of the at least one group of equipment.

In yet another embodiment, the present invention is a computer program product for monitoring equipment data, the computer program product comprising: one or more computer processors, one or more computer readable storage media, and program instructions stored on the one or more computer readable storage media for execution by, at least one of the one or more processors, the program instructions comprising: program instructions to identify at least one group of equipment; program instructions to compile at least one piece of equipment within the at least one group of equipment, wherein the at least one piece of equipment is based on the at least one group of equipment; program instructions to assign at least one parameter for the at least one group of equipment, wherein the at least one parameter is applied to each of the at least one pieces of equipment within the at least one group of equipment; program instructions to set a range of acceptable values for a first group of the at least one parameter; and program instructions to receive at least one value associated with at least one piece of equipment of the at least one group of equipment.

BRIEF DESCRIPTION OF THE DRAWINGS

FIG. 6 depicts an image of a user interface in relation to the reporting module operational steps, in accordance with an embodiment of the present invention.

FIG. 10 depicts an image of a user interface in relation to the reporting module operational steps, in accordance with an embodiment of the present invention.

DETAILED DESCRIPTION

Figure 1:
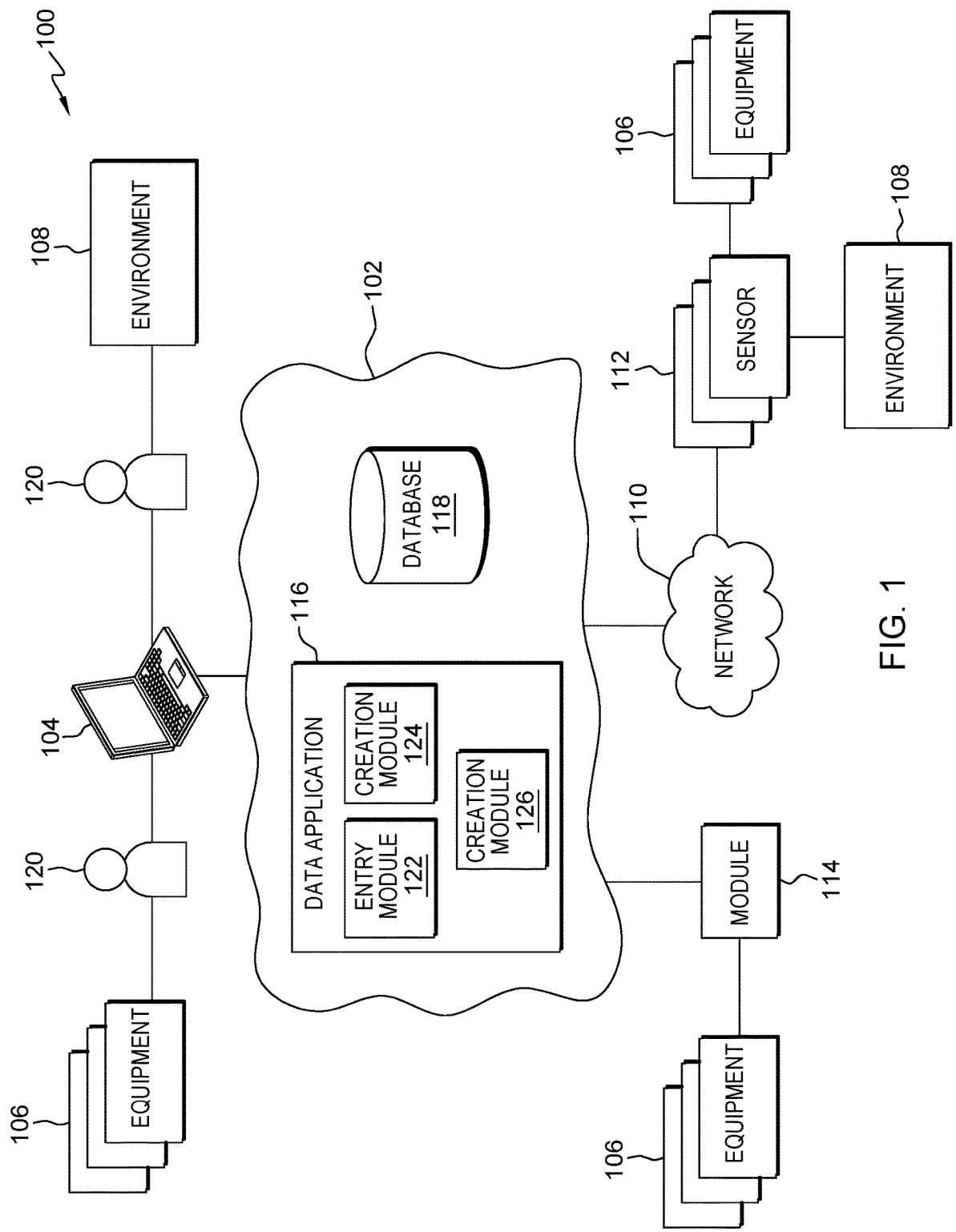
FIG. 1 depicts a block diagram of a computing environment, in accordance with one embodiment of the present invention.

As will be appreciated by one skilled in the art, aspects of the present invention may be embodied as a system, method, computer program, cloud-based product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "frame", or "system." Furthermore, aspects of the present invention may take the form of a cloud-based App or computer program product embodied in one or more computer readable medium(s) such as mobile phones, or any internet-connected device, having computer readable program code/instructions embodied thereon.

The application allows users of various facilities to monitor and/or record equipment parameters in their facilities using an integrated computer interface rather than a paper or other physical form. The interface consists of three areas: An extensive preferences panel allowing users to setup any equipment, environments, or processes and define ways to monitor their readings and/or performance, a system of flexible data input, and reporting features aimed at assessing equipment, environment, or process performance and allowing comparison of parameters and equipment within the same equipment type using simple math definitions of datatypes such as integers, Boolean, and floating-point numbers.

Embodiments of the present invention disclose an approach for monitoring equipment, environments, and processes—and setting tolerable conditions. This allows the system to notify personnel of changes including data values which are out of user-defined range or data drift in the equipment, environment, or process. This enables personnel to respond to adverse circumstances accordingly and modify the settings or resolve the problem. Embodiments of the present invention disclose an approach for equipment monitoring, equipment modifying, and data collection.

The proposed software will be useful for practitioners and operators of facilities and facilities requiring periodic monitoring of systems including, but not limited to equipment, consumables and materials, such as those involving clinical, commercial, construction, agricultural, research, life sciences, engineering, physics, forensic and other activities requiring recurrent monitoring and quality control certification of devices, systems and equipment.

The real-world use for the proposed application is for operators of facilities to monitor equipment periodically and derive permanent records electronically with the added advantage of assessing device performance such as unexpected fluctuations or parameter drift for instance a subtle change over time of cell tissue culture incubator temperature readings. In additional embodiments, the application can be used even if no devices are present within the facilities. For example, a zoo could use the application to store data related to feeding schedule, weight, and other activities and traits of the animals in the zoo.

The present invention will now be described in detail with reference to the Figures.

FIG. 1 depicts a block diagram of a computing environment 100 in accordance with one embodiment of the present invention. FIG. 1 provides an illustration of one embodiment and does not imply any limitations regarding the environment in which different embodiments maybe implemented.

In the depicted embodiment, computing environment 100 includes cloud computing environment 102, computing device 104, equipment 106, environment 108, network 110, sensors 112, users 120, data application 116, and database 118. Computing environment 100 may include additional servers, computers, or other devices not shown.

As shown, cloud computing environment 102 comprises one or more cloud computing nodes with which local computing devices used by cloud consumers, such as, for example, personal digital assistant (PDA) or cellular telephone, desktop computer, laptop computer, and/or a computer system may communicate. Nodes may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device.

Embodiments of the present invention recognize that there are different methods in a cloud marketplace for orchestrating service provisioning and management for cloud service providers. However, there is a need for a standard method in cloud computing for orchestrating service provisioning and management for cloud service providers. Embodiments of the present invention add a standard method for orchestrating services provisioning and management in a cloud marketplace, by providing a systematic approach and a process to help service providers integrate their services into a cloud marketplace in a structured step by step manner. Additionally, embodiments of the present invention may reduce errors in integration as the present invention is fully tested with systematic step by step implementation processes.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Equipment 106 represents the one or more pieces of equipment, devices, instruments, or components which measure at least one variable. The equipment 106 maybe in communication either directly or indirectly with cloud computing environment 102. In the depicted embodiment, the equipment is able to communicate with the cloud computing environment 102 either through a user 120 and computing device 104, through a separate network 110, or directly. In instances where the equipment 106 is directly in communication the cloud computing environment 102, a module 114 which is able to gather the data from the equipment 106 and communicate the cloud computing environment 102 is required. Examples of equipment 106 are, but not limited to incubators, water bathes, manifolds, freezers, refrigerators, stages, or a variety of other pieces of equipment.

Environment 108 represents other sources in which data may be desired to be uploaded into the application. This may be, but not limited to, the environment in which the equipment is within (e.g. the laboratory), data collected that is collected manually (e.g. amount of food fed to an animal in the zoo), or other pieces of information which the user 120 or other personal desire to be measures. In the depicted embodiment, the environment data 108 is either connected to the cloud computing environment 102 through a sensor 112, or through a user 120.

Computing device 104 may be a management server, a web server, or any other electronic device or computing system capable of processing program instructions and receiving and sending data. In some embodiments, computing device 104 may be a laptop computer, tablet computer, netbook computer, personal computer (PC), a desktop computer, a smart phone, mobile computing device, or any other programmable electronic device capable of communicating with the cloud computing environment 102. In other embodiments, computing device 104 may represent a server computing system utilizing multiple computers as a server system, such as in a cloud computing environment. In another embodiment, computing device 104 represents a computing system utilizing clustered computers and components to act as a single pool of seamless resources. In other embodiments, computing device 104 may include any combination of Data Application 116, entry module 122, creation module 124, and reporting module 126. Computing device 104 may include components, as depicted and described in further detail with respect to FIG. 3.

Network 110 may be a local area network (LAN), a wide area network (WAN) such as the Internet, any combination thereof, or any combination of connections and protocols that can support communications between the sensors 112 and the cloud computing environment 102. Network 110 may include wired, wireless, or fiber optic connections. In some embodiments network 102 is an intranet.

Sensor 112 may be any external sensor or data transmitting device which is able to connect with and transmit data to and from network 110 and connect with and receive data from the equipment 106 or the environment 108. The sensor 112 may be integrated into the equipment 106 or may be a separate component.

Data Application 116 communicates with the equipment 106, computing devices 104, networks, or users 120 to receive data and provides a flexible, and non-rigid application to organize, store, and review the received data In the depicted embodiment, data application 116 utilizes the cloud computing network 102 to connect with the network 110, equipment 106, and computing devices 104 to receive the data. In other embodiments, data application 116 may be located on various computing devices, networks, or servers provided the equipment 106, user 120, computing device 104 or sensor 112 can communicate with the data application 116 and that data application 116 can communicate with database 118.

The cloud computing environment 102 may have varying and various degrees of security, such as data and user encryption, two-factor authentication, and the like to protect the data. The security of the network is based on the user preferences.

Database 118 may be a repository that may be written to and/or read by data application 116, entry module 122, creation module 124, and reporting module 126. Data gathered by or from data application 116, entry module 122, creation module 124, and reporting module 126 may be stored to database 118. In one embodiment, database 118 is a database management system (DBMS) used to allow the definition, creation, querying, update, and administration of a database(s). In the depicted embodiment, database 118 is in incorporated into the cloud computing environment 102. In other embodiments, database 118 resides on another server, or another computing device, provided that database 118 is accessible to data application 116, entry module 122, creation module 124, and reporting module 126.

Figure 2A:
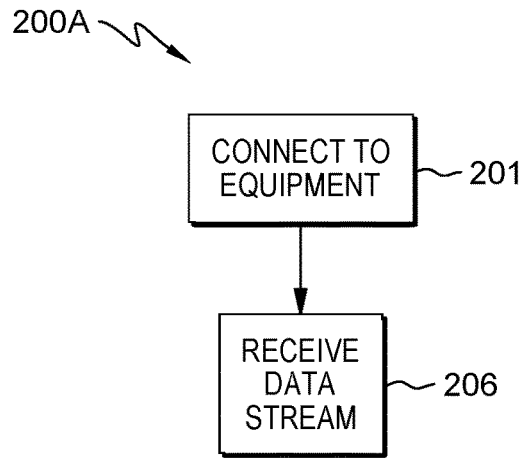
FIG. 2A depicts a flowchart of the operational steps taken by an entry module, in accordance with an embodiment of the present invention.
Figure 2B:
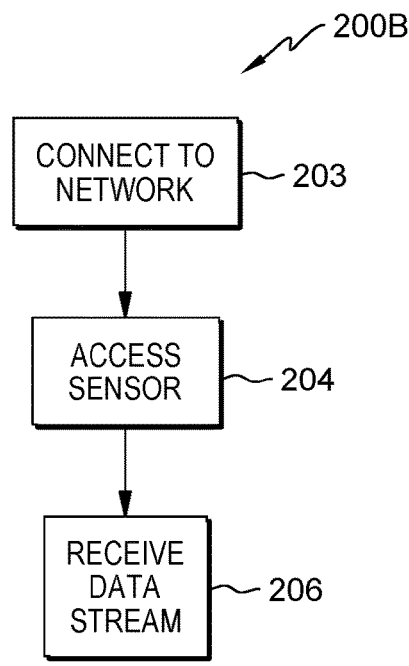
FIG. 2B depicts a flowchart of an additional embodiment of the operational steps taken by entry module, in accordance with an embodiment of the present invention.
Figure 2C:
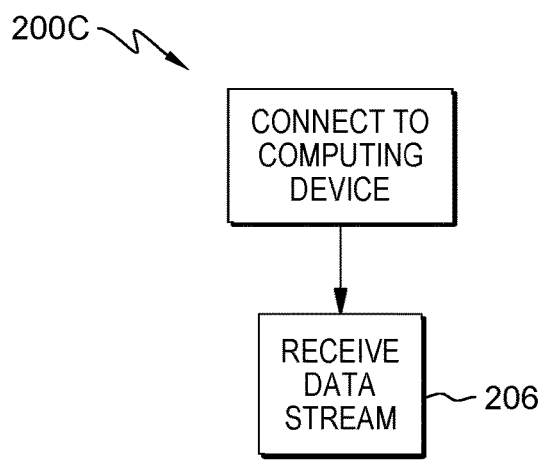
FIG. 2C depicts a flowchart of an additional embodiment of the operational steps taken by entry module, in accordance with an embodiment of the present invention.

FIGS. 2A-2C depict flowcharts of the operational steps taken by entry module 112 in three different scenarios. Additional scenarios may exist, and the three scenarios used in the FIGS. 2A-2C are purely for exemplary purposes and to demonstrate the versatility of the data application 122. FIGS. 2A-2C provides an illustration of one embodiment and does not imply any limitations regarding a computing environment in which different embodiments may be implemented. Many modifications to the depicted flowchart may be made.

In FIG. 2A the entry module 122 connects directly to the equipment 106, or if the equipment has a module 114 through which the equipment 114 connects to the data application 112. The entry module 112 is able to directly receive the data stream and store the location within the database 118. In FIG. 2B, the entry module 122 connects with an external network or intranet 110 which is connected to the sensor 112. The sensor 112 is in communication with the environment 108 and/or the equipment 106. The sensor 112 is able to receive and process the data, and through the intranet or network 110 entry module 122 is able to receive the data stream and store the data in the database 118. In FIG. 2C entry module 112 communicates with a computing device 104 where the data is input. The data is input by a user 120 who is recording the data either directly into the computing device 104 or as a final step in the data gathering process. In a single facility one, two, all three, or even additional methods of data receiving may be incorporated based the equipment 106, the environment 108, and the object of the users 120.

Figure 3:
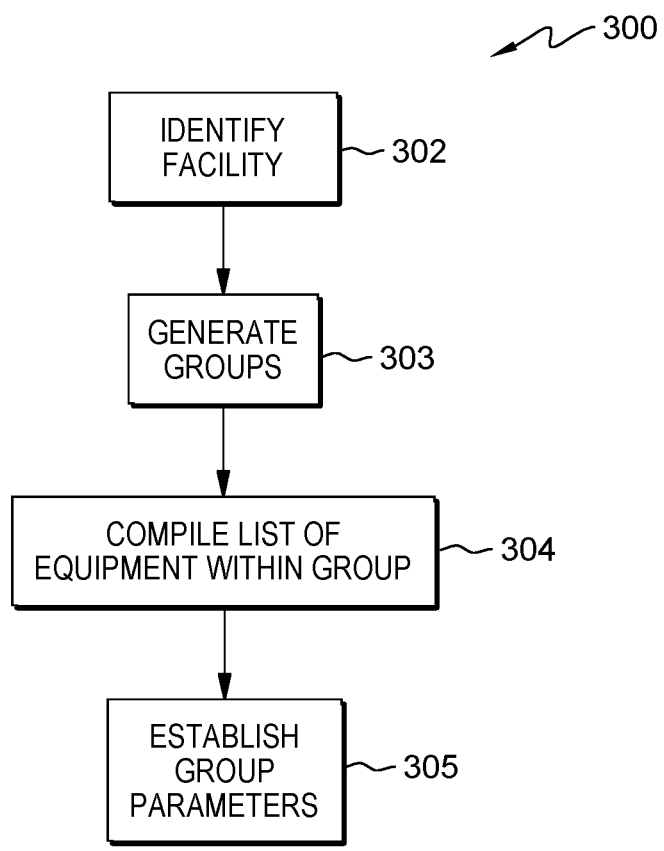
FIG. 3 depicts a flowchart of the operational steps taken by a creation module, in accordance with an embodiment of the present invention.

FIG. 3 depict a flowchart of the operational steps taken by creation module 122 to generate the facility equipment list. To begin to input the data from the equipment 106 and the environment 108, a log plan needs to be created with the desired inputs. FIG. 3 provides an illustration of one embodiment and does not imply any limitations regarding a computing environment in which different embodiments may be implemented. Many modifications to the depicted flowchart may be made.

In step 302, creation module 122 identifies the facility. To begin the process of building the input list, the facility needs to be identified. This identification can either be manually input by the user 120 or received by the creation module 112 from the database or an external source.

In step 303, the creation module 122 creates a group. The group is used to identify a specific type of equipment 106 (e.g. incubators shown in FIG. 5) or the specific environmental data input. In some embodiments, these groups are manually created by the user 120. In additional embodiments, preset group options may be presented or populated based on previously recorded or stored data. In additional embodiments, creation module 112 may have predetermined groups stored in database 118. In yet additional embodiments, where equipment 106 has a module 114 or a sensor 112 which is in communication with the data application 116, the creation module 122 creates groups for the equipment which the data application 116 is in communication with.

In step 304, the creation module 112 compiles list of individual pieces of equipment for the group. Each group is required to have one piece of equipment 106 to be activated. Each piece of equipment 106 within the group is assigned the established parameters. The pieces of equipment are all assigned an individual name, either manually input or received from the equipment 106.

Figure 5:
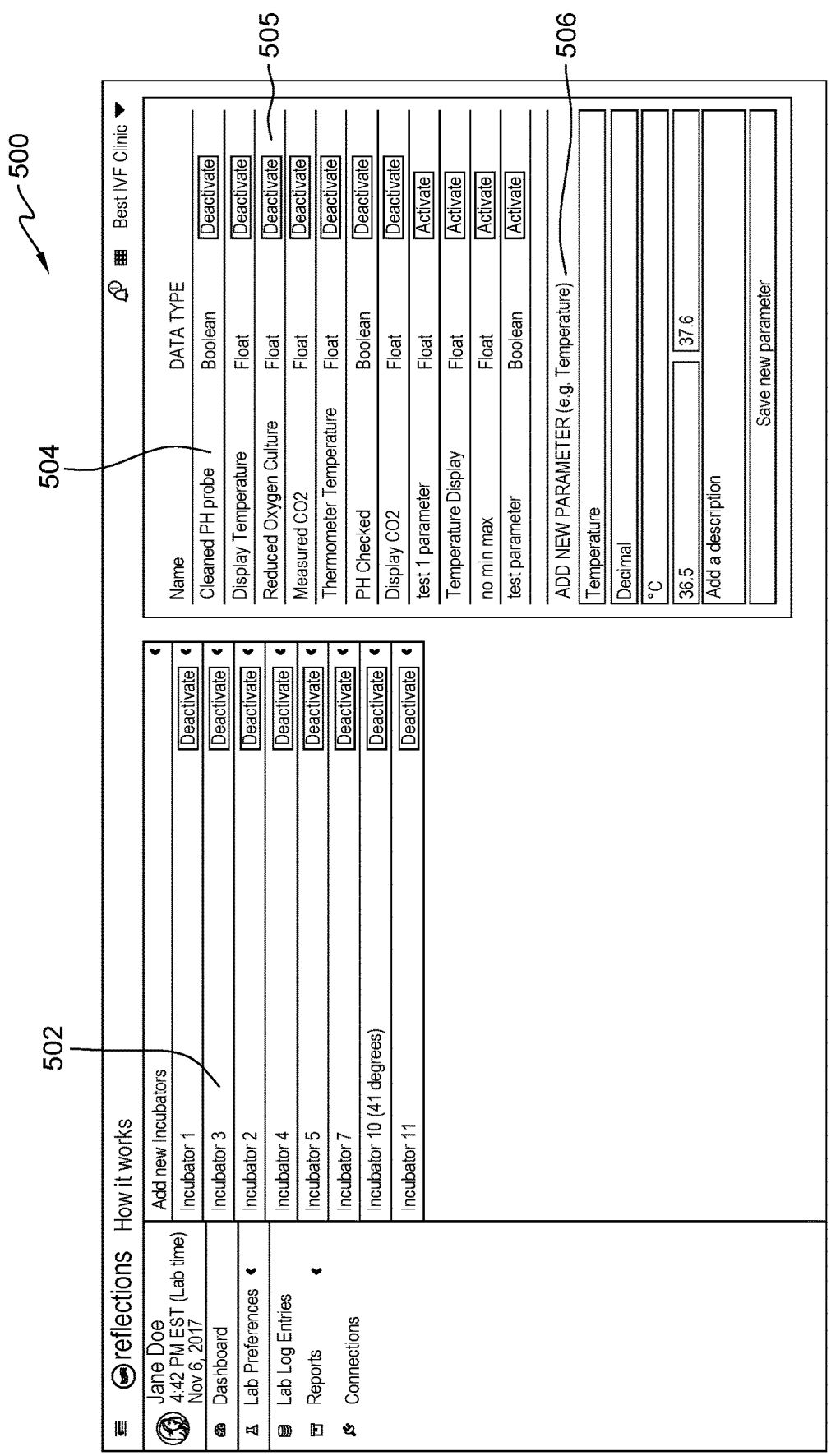
FIG. 5 depicts an image of a user interface in relation to the creation module operational steps, in accordance with an embodiment of the present invention.

In step 305, creation module 112 establishes the parameters of the group. Each group has a specific and completely customizable set of parameters which can be set, so that each individual piece of equipment 106 within the group will be required to measure. The parameters are able to be customizable to the user's 120 requirements. The parameters are not limited to the functionality of the equipment. Additionally, the parameters may be tasks related to the equipment, such as cleaning the equipment, or the like. When inputting the parameters, the creation module 112 requests a name of the parameter, a unit of measurement (if relevant), and a tolerance (if relevant). FIG. 5 depicts an image of user interface 500 where each piece of equipment 502 is shown with a user generated name/title, as well as the group's parameters 504 which have been either activated or deactivated through the selection icon 505, and the parameter input section 506 where additional parameters can be applied to all pieces of equipment 502 in the group. For example, the parameter may be internal temperature, measure in Celsius, be to the tenth decimal place, and have a tolerance of 36.5 to 37.6 degrees Celsius set in the parameter input section 506. In some embodiments, the creation module 112 receives a set of parameters which a specific type of equipment 106 can measure and provide a base set of parameters for the user 120. The parameters generated are stored in database 118.

In one embodiment, parameters can be expressed as a data-type using six different input configurations: Boolean, decimal, integer, date, multiple choice or text.

In some embodiments, the creation module 122 is able to detect or access database 118 to gather information about the equipment and generate or populate parameters associated with the group.

In some embodiments, creation module 122 accesses database 118 to gather previously created groups, parameters, and equipment 106 identifications and provides the previously generated data to the user 120. This assists the user in generating the groups, parameters, and equipment identifiers quicker if there are instances where there is repetition of inputs.

Figure 4:
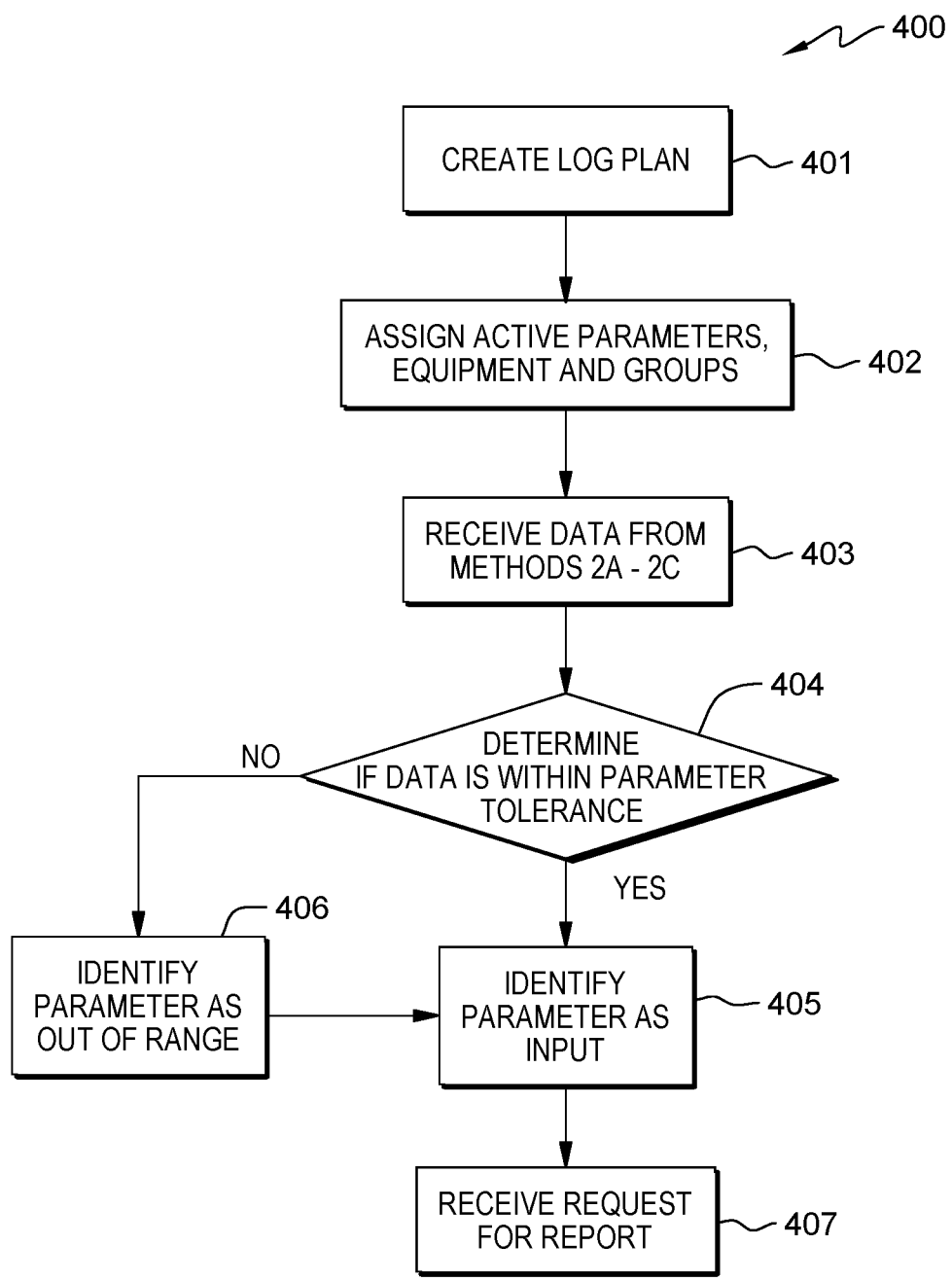
FIG. 4 depicts a flowchart of the operation steps taken by a reporting module, in accordance with an embodiment of the present invention.

FIG. 4 depict a flowchart of the operational steps taken by reporting module 124 to create the data log. Once the facility groups, equipment, and parameters have been selected, reporting module 124 provides the recording of the data. FIG. 3 provides an illustration of one embodiment and does not imply any limitations regarding a computing environment in which different embodiments may be implemented. Many modifications to the depicted flowchart may be made.

In step 401, reporting module 124 creates the log plan. The log plan is related to the duration of the log plan, e.g. one hour, day, week, month, etc. In the depicted embodiment, the log plan is set at one (1) day.

Figure 6:
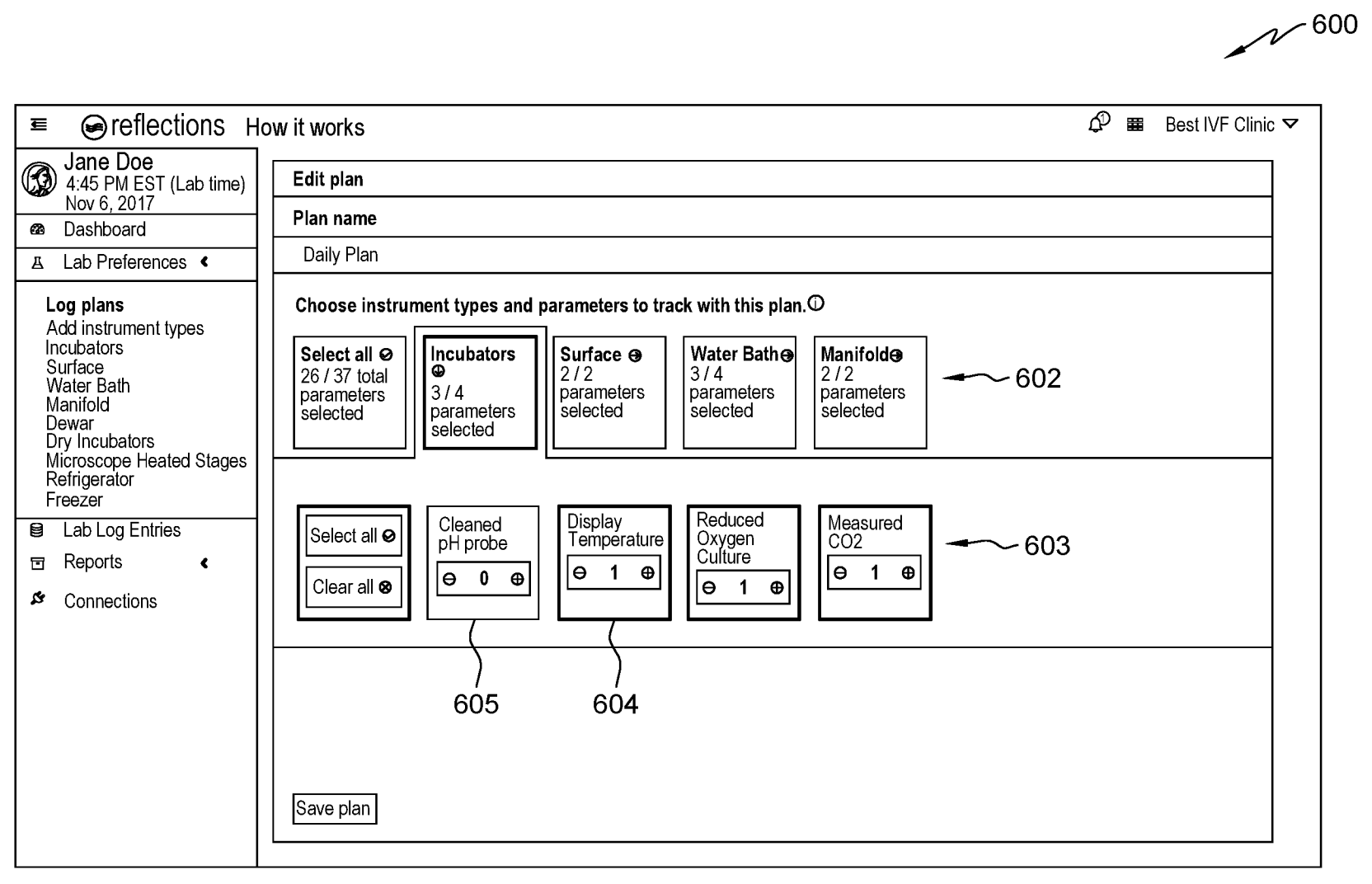

In step 402, reporting module 124 identifies the active elements of the log plan. When the log plan is being created, each group, individual piece of equipment of the group, and each parameter of the group must be set to either active or de-active. If the element is set to active, it is required to be populated and is visible to the user. If the element is selected as deactivated, once the log plan is completed, these elements become hidden or invisible to the user. FIG. 6 depicts an image of user interface 600, where groups 602 are selected with provide a drop-down menu to each of the active parameters 603 are shown. In the depicted embodiment, 3 of the parameters 604 are selected to have one (1) input for the log plan, and 1 parameter 605 is selected to have zero inputs for the log plan. This is shown in each of the groups 602. In some embodiments, each active parameter requires the number of times that parameter is to be measured throughout the length of the log plan. For example, if the temperature is to be measured every hour, the parameter can be set to twenty-four (24) to require twenty-four different inputs of the parameter. In further embodiments, each instance of the parameter input may be locked or unmodifiable until a certain time from the creation of the log plan.

Figure 7:
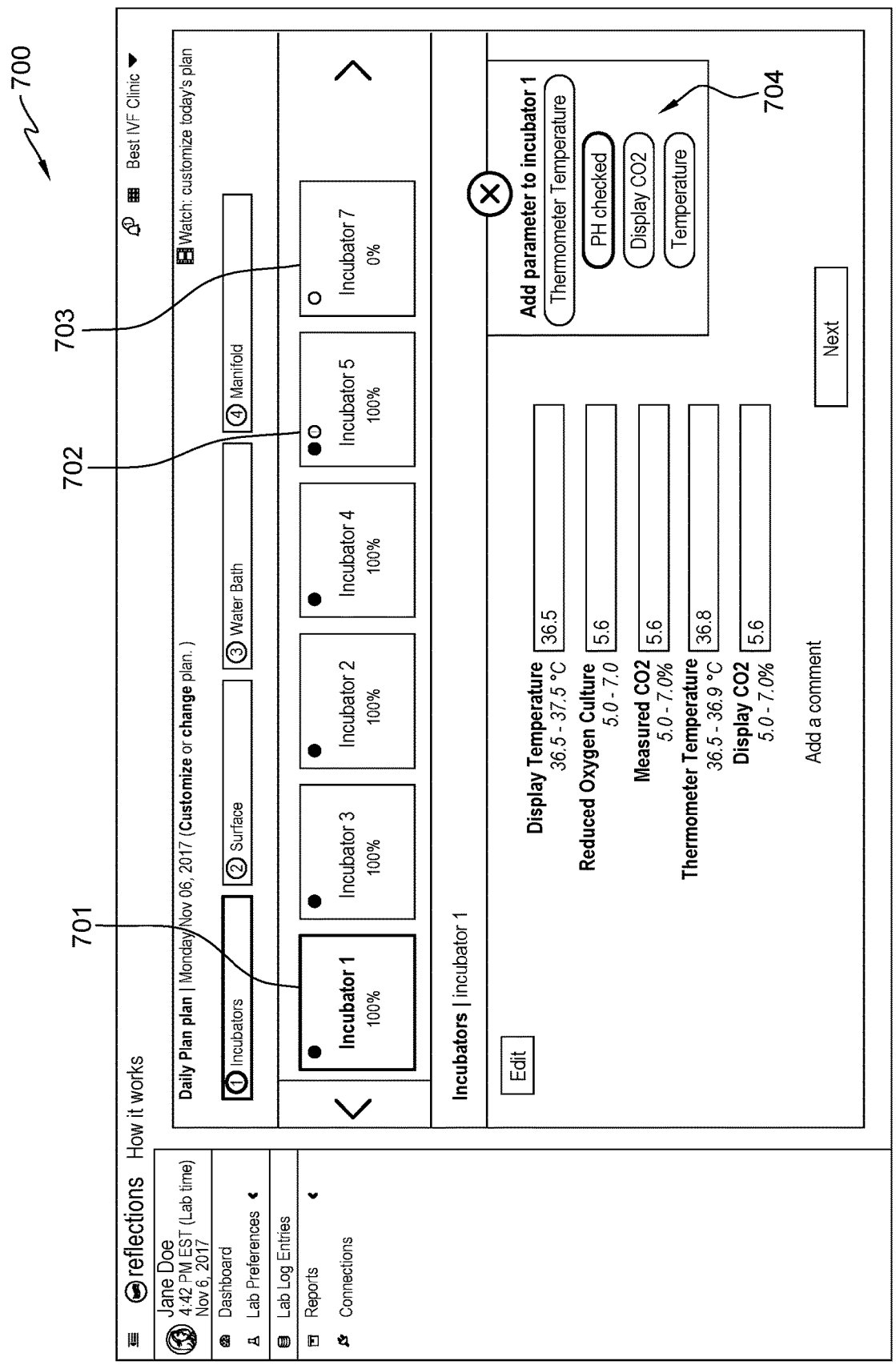
FIG. 7 depicts an image of a user interface in relation to the reporting module operational steps, in accordance with an embodiment of the present invention.
Figure 8:
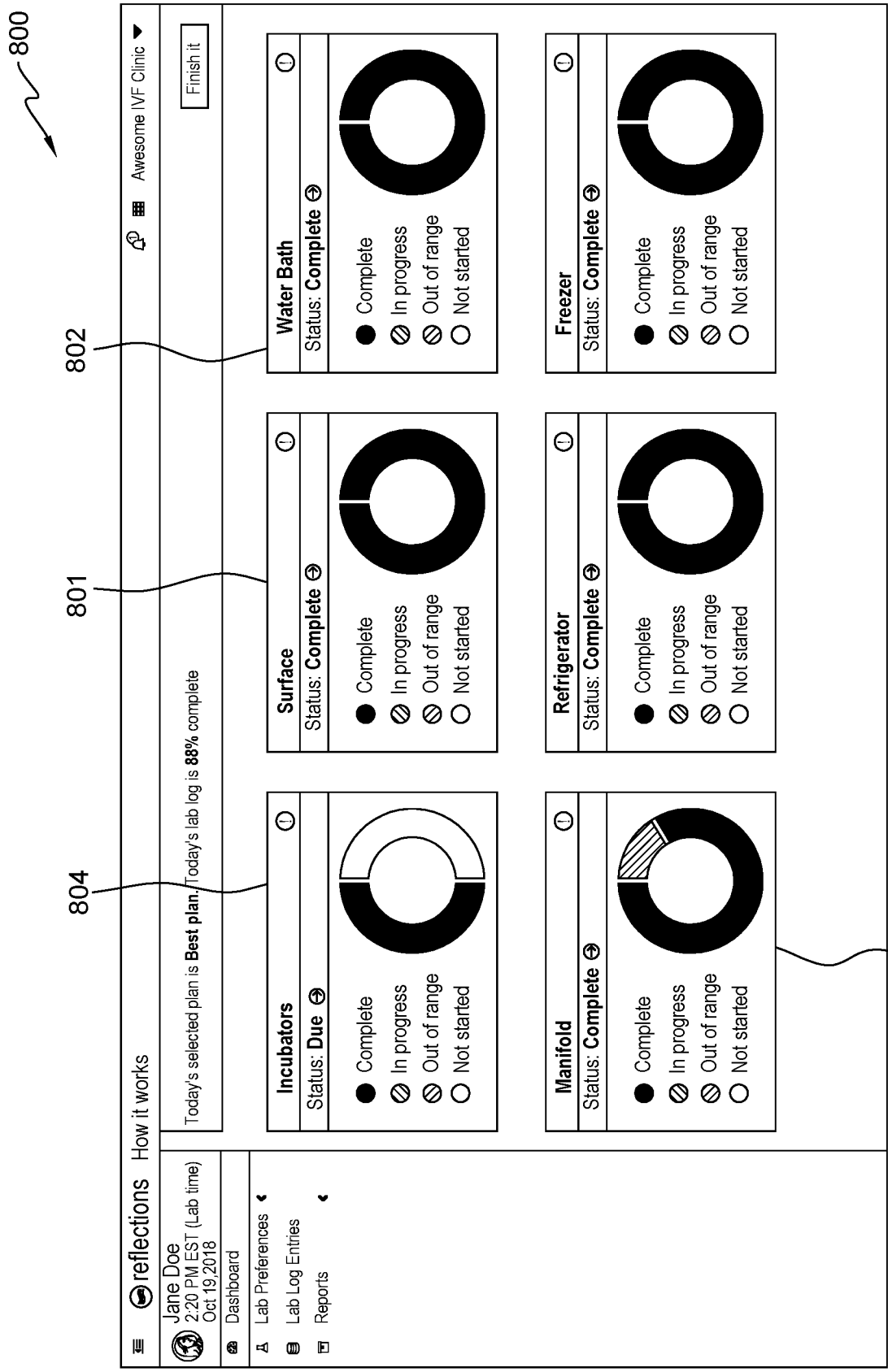
FIG. 8 depicts an image of a user interface in relation to the reporting module operational steps, in accordance with an embodiment of the present invention.
Figure 9:
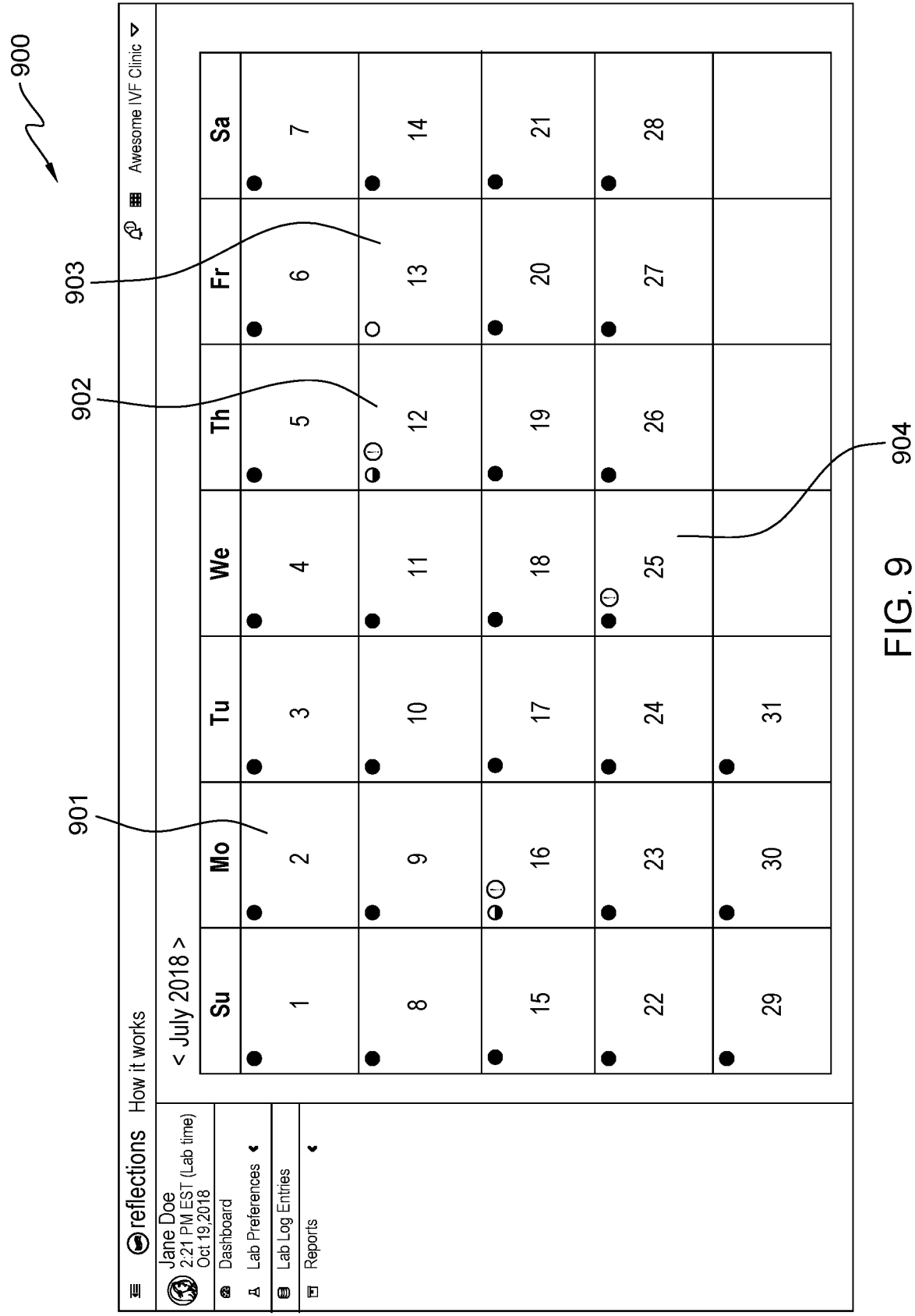
FIG. 9 depicts an image of a user interface in relation to the reporting module operational steps, in accordance with an embodiment of the present invention.

In step 403, reporting module 124 receives data associated with the active log plan elements. This data, as shown in FIGS. 2A-2C may come manually, automatically, or both. The reporting module 124 identifies that a value has been received and annotates that a value has been input. As depicted in FIGS. 7-9 regardless of the data being within the tolerance range or outside of the tolerance range, the reporting module 124 identifies that a value has been received. Depicted in FIG. 7 an image of a user interface 700, the pieces of equipment in the group are shown where equipment 701 has received input, equipment 702 has received data and some of the data is out of range but still complete, and equipment 703 is incomplete with data received. In each equipment icon, there is a visual indicator to show the current status of the data related to that pieces of equipment. Depicted in FIG. 8 is a user interface 800, depicting a graphical representation of the values received for each group 801. In the depicted embodiment, group 804 is shown with a portion of completed data and a portion of not completed data. Group 802 is shown with completed data. Group 803 is shown with all data completed but a portion of that data out of range. FIG. 9 depicts an image of a user interface 900 showing a calendar setup, where each day is shown where the log plan is either complete 901, incomplete 903, partially completed 902, and either completed or partially completed with out of range data 902 and 904.

In some embodiments, parameters may be added to specific pieces of equipment 106 at this stage to allow a single member of a group to have additional, or few (by deactivating equipment specific parameters). FIG. 7 depicts when a piece of equipment is selected, a user can apply an equipment specific parameter 704 which is added to that specific pieces of equipment an no other pieces of equipment in the group.

By default, each parameter has no value and is identified as incomplete until a value is received. Each parameter is identified by a visual indicator as being incomplete. In the depicted embodiment and FIGS. 7-9, the default parameter is indicated by an unfilled circle next to the piece of equipment icon. In the depicted embodiment, if one value is incomplete, the indicator for the equipment is identified as incomplete. In some embodiments, when a piece of equipment has some parameters completed but not all, an indicator of partial completion (e.g. a half full circle) is present next to the piece of equipment.

In decision 404, the reporting module 124 determines if the received data is within the parameter tolerance. Based on the parameter tolerance (if present), the reporting module 124 determines if the received value is within or outside of the tolerance range. If the reporting module 124 determines the received data is within the parameter tolerance, or the parameter has no tolerance (YES, proceed to step 405) the parameter for the equipment (a group as a whole) is identified as completed. If reporting module 124 determines that the received data is not within the parameter tolerance (NO, proceed to step 406), and the parameter for the specific piece of equipment is identified the out-of-range data. The reporting module 124 still identifies that data has been input and is used to calculate the percentage of data input. In-range and out-of-range input data is all viewed as received and applied to the completeness of the equipment data.

In step 405, the reporting module 124 identifies the input as received. This input is stored in database 118 and is used by reporting module 124 in the generation of the visual representation of group and equipment within the group.

Figure 10:
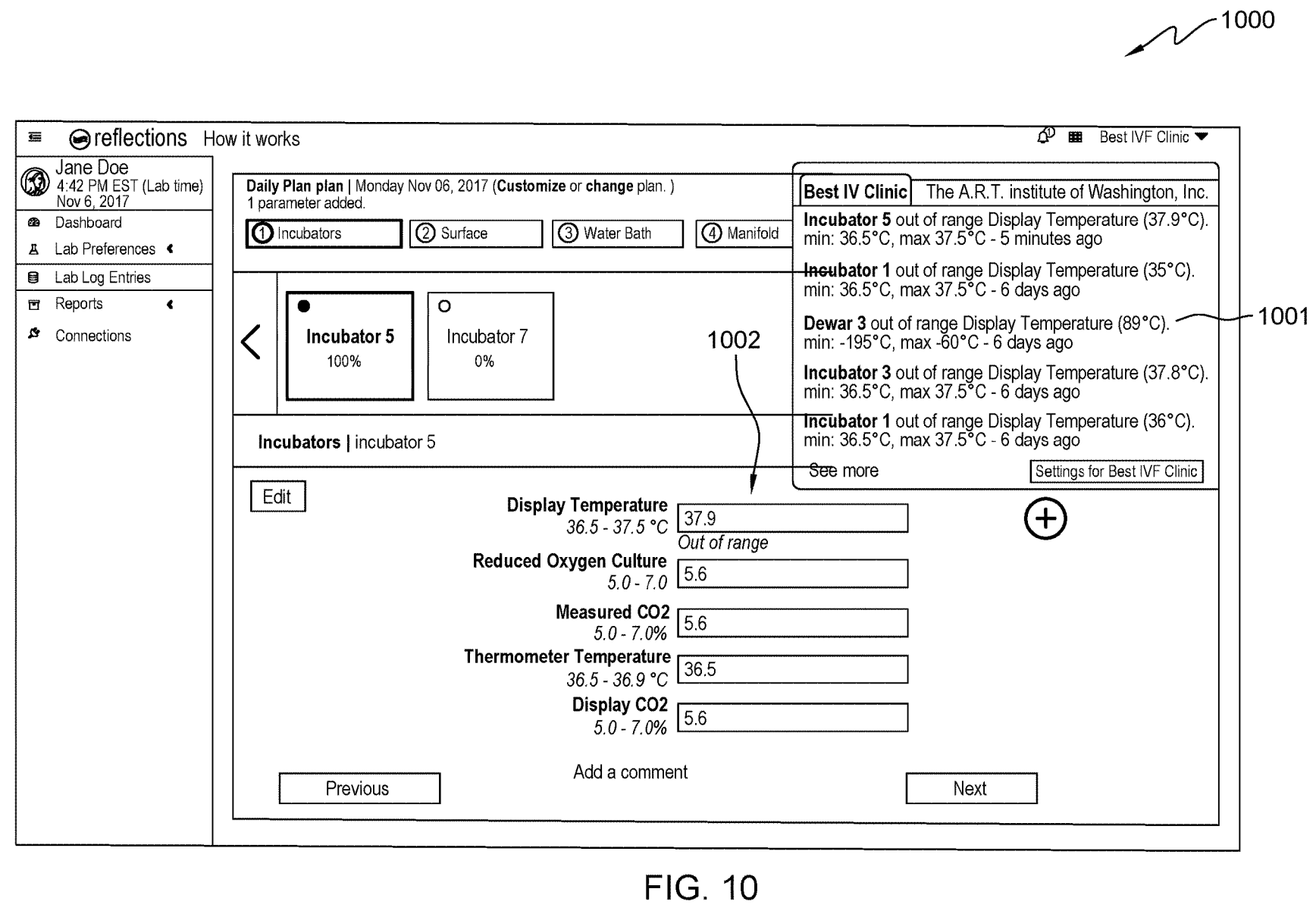

In step 406, the reporting module 124 identifies the input as being out of the tolerance range. For exemplary purposes, FIGS. 6-9 depict screen shots of equipment within a group, all of the groups within a facility, and a calendar view of the facility respectively wherein data was received which was outside of the tolerance range. The reporting module 124 issues a notification to personnel about the out-of-range data. The notification is presented to the user through the user interface. In the depicted embodiment, the reporting module 124 generates an outline of the input field, textual identifier "OUT OF RANGE", a drop-down menu of the out of range entries over a predetermined time range or number, a visual indicator next to the equipment 106, group, or date. In FIG. 10 depicting a user interface 1000 where data 1002 is received which is out range, a notification is presented to the user 1001 of the present out or range data, and a selection of previously out of range data.

In FIG. 10 depicting a user interface 1000 where data 1002 is received which is out range, a notification is presented to the user 1001 of the present out or range data, and a selection of previously out of range data. In some embodiments, an audio notification or send a message to a personnel's computing device or smartphone. In additional embodiments, reporting module 124 may permit the personnel a predetermined time period to adjust the input. For example, if the user incorrectly entered the information, they are provided a window to correct the data. In some embodiments, the after the conclusion of the time period, or at the conclusion of the log plan the input(s) is locked and is unmodifiable by those without proper clearance or override approval.

Figure 11:
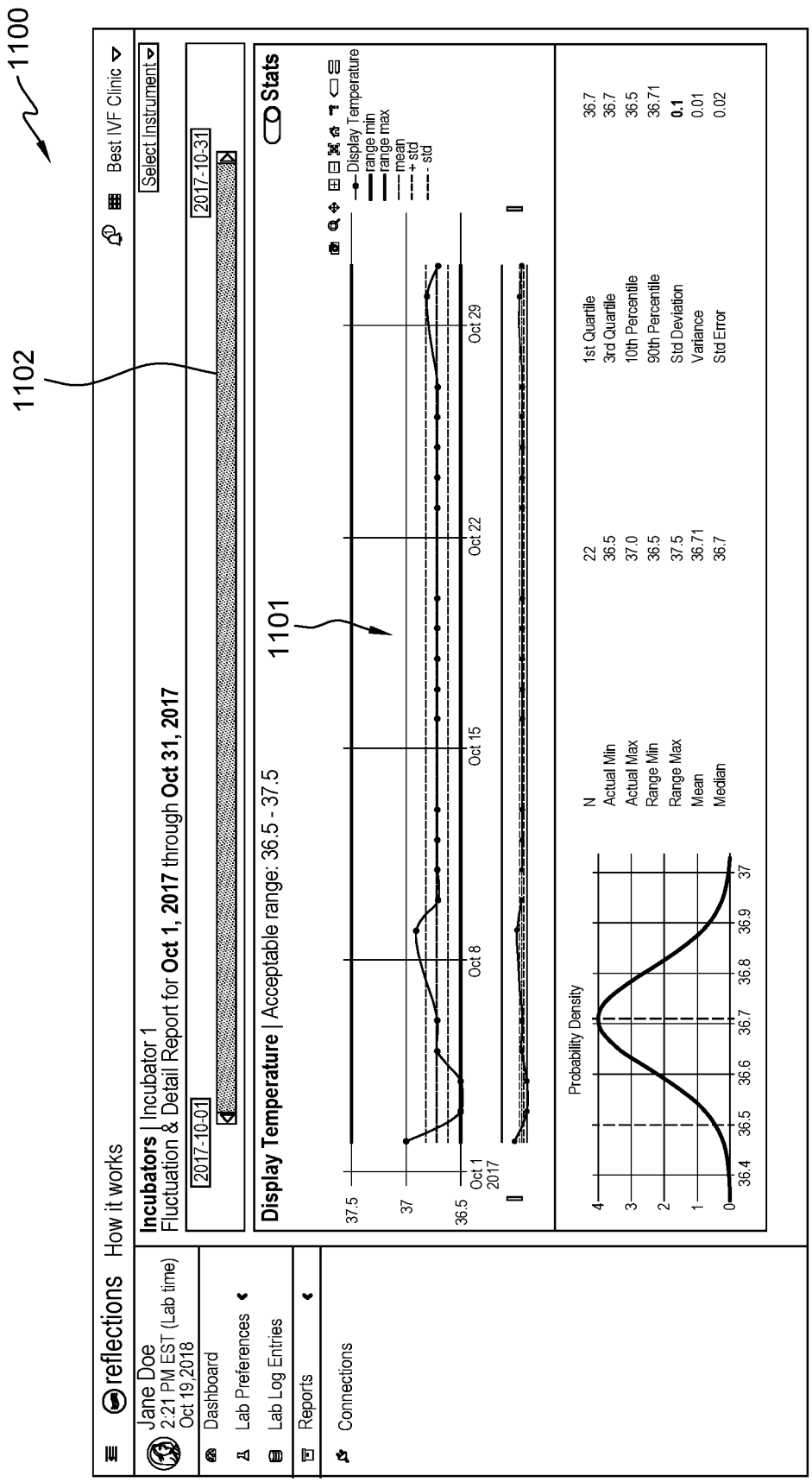
FIG. 11 depicts an image of a user interface in relation to the reporting module operational steps, in accordance with an embodiment of the present invention.

In step 407, reporting module 124 generates a graphical representation of the received inputs and data. The report 1100, as depicted in FIG. 11 is customizable by the user based on desired group, equipment, parameter, time frame, and the like selected by the user. Additional graphical representations may be incorporated, the location of the graphics is modifiable and adjustable, and the user can interact with the graphical representations of data by using an input device. In the depicted embodiment, each "point" 1101 on the graph allows the user to interact with to provide more information associated with that "point". The scale and time frame 1102 of the graph is adjustable and modifiable In some embodiments, the report may be provided at any instance at the operator's request. In additional embodiments, the report may be generated at predetermined intervals or instances. In the depicted embodiment, the report is generated automatically upon the requesting of a report and upon the determination that a response has been provided to a notification.

Reports can be static or dynamic (interactive). A first reporting type is a graphic interface that shows fluctuations of each assessed parameter associated with an equipment 104N and 104N'. The fluctuations are made visual using a flexible time-scale interval. Data-points are shown with set allowable ranges for each parameter. Graphs can be dragged and dropped to combine multiple parameters within each time interval. An additional type of report allows sorting and filtering of parameters and equipment. This dynamic system can be presented in a familiar way for a Health inspector or certification agency. Reports can be electronically signed. Reports can be printed or kept as pdfs. Reports can also be filed inside the application.

Figure 12:
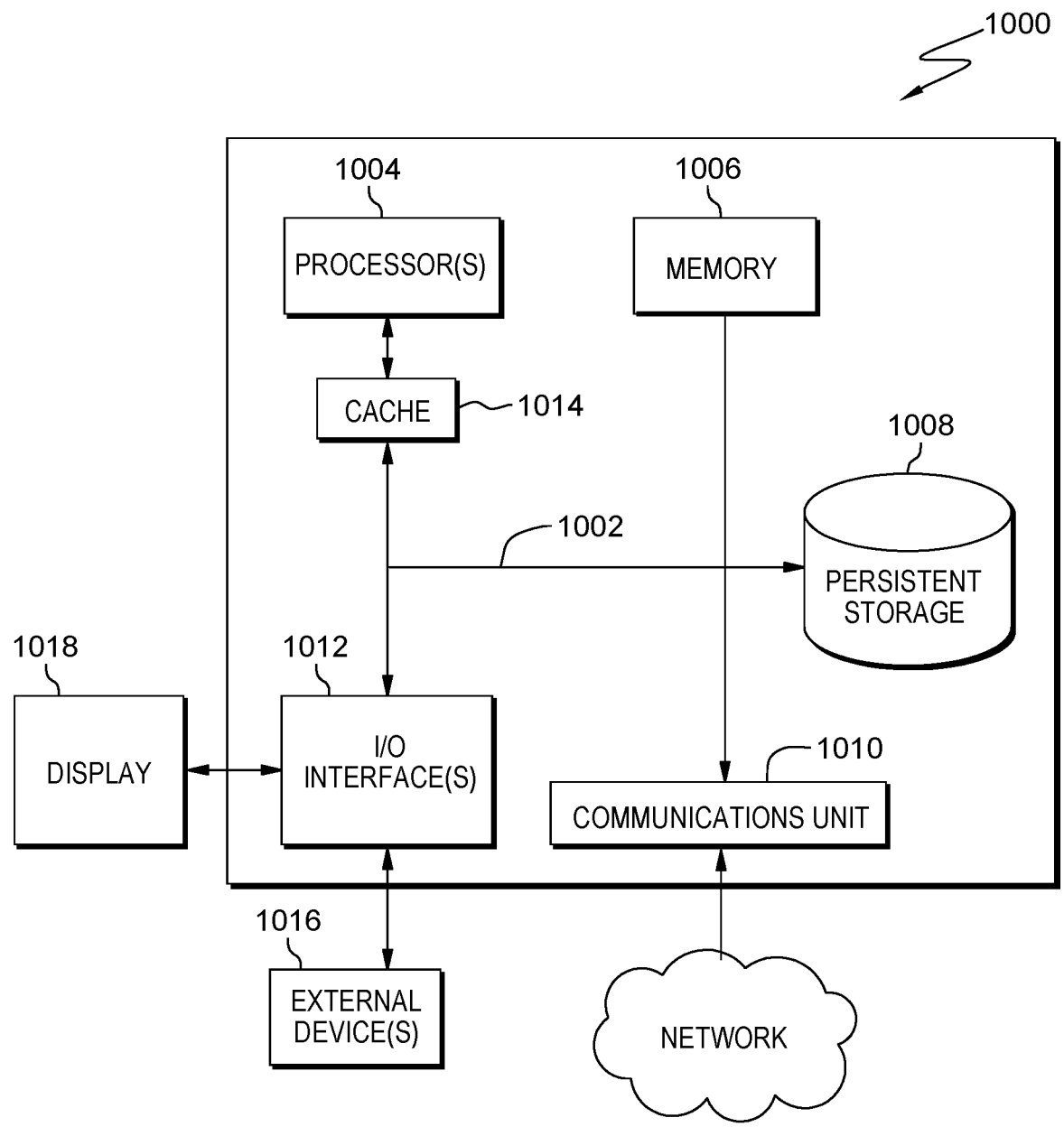
FIG. 12 depicts a block diagram of components of a computing device, in accordance with an illustrative embodiment of the present invention.

FIG. 12 depicts a block diagram 1000 of components of a computing device (e.g. server 106 or end point device 108), in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made. It should be appreciated FIG. 1 provides only an illustration of one implementation and does not imply any limitations with regard to the environments in which different embodiments may be implemented.

Computing environment 1000 is, in many respects, representative of the various computer subsystem(s) in the present invention. Accordingly, several portions of computing environment 1000 will now be discussed in the following paragraphs.

Computing device 1000 includes communications fabric 1002, which provides communications between computer processor(s) 1004, memory 1006, persistent storage 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any additional hardware components within a system. For example, communications fabric 1002 can be implemented with one or more buses.

Computing device 1000 is capable of communicating with other computer subsystems via network 1001. Network 1001 can be, for example, a local area network (LAN), a wide area network (WAN) such as the Internet, or a combination of the two, and can include wired, wireless, or fiber optic connections. In general, network 1001 can be any combination of connections and protocols that will support communications between computing device 1000 and other computing devices.

Memory 1006 and persistent storage 1008 are computer-readable storage media. In one embodiment, memory 1006 includes random access memory (RAM) and cache memory 1014. In general, memory 1006 can include any suitable volatile or non-volatile computer-readable storage media.

Memory 1006 is stored for execution by one or more of the respective computer processors 1004 of computing device 1000 via one or more memories of memory 1006 of computing device 1000. In the depicted embodiment, persistent storage 1008 includes a magnetic hard disk drive. Alternatively, or in addition to a magnetic hard disk drive, persistent storage 1008 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer-readable storage medium that is also part of persistent storage 1008.

Communications unit 1010, in the examples, provides for communications with other data processing systems or devices, including computing device 1000. In the examples, communications unit 1010 includes one or more network interface cards. Communications unit 1010 may provide communications through the use of either or both physical and wireless communications links.

I/O interface(s) 1012 allows for input and output of data with other devices that may be connected to computing device 1000. For example, I/O interface 1012 may provide a connection to external devices 1016 such as a keyboard, keypad, camera, a touch screen, and/or some other suitable input device. External devices 1016 can also include portable computer-readable storage media such as, for example, thumb drives, portable optical or magnetic disks, and memory cards. Software and data used to practice embodiments of the present invention, e.g., program or functions can be stored on such portable computer-readable storage media and can be loaded onto persistent storage 1008 of computing device 1000 via I/O interface(s) 1012 of computing device 1000. Software and data used to practice embodiments of the present invention, e.g., program or functions can be stored on such portable computer-readable storage media and can be loaded onto persistent storage 1008 of computing device 1000 via I/O interface(s) 1012 of computing device 1000. I/O interface(s) 1012 also connect to a display 1018.

Display 1018 provides a mechanism to display data to a patient and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the patient's computer, partly on the patient's computer, as a stand-alone software package, partly on the patient's computer and partly on a remote computer or entirely on the remote computer or server. In the latter scenario, the remote computer may be connected to the patient's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

What is claimed is:

1. A method for monitoring equipment data, the method comprising:
    identifying, by one or more processors, at least one group of equipment, wherein the equipment is able to generate data;
    identifying, by one or more processors, a facility in which the at least one group of equipment is located;
    compiling, by one or more processors, an equipment type of each piece of equipment of the at least one group of equipment;
    manipulating, by one or more processors, the at least one group of equipment into sub groups based on a known equipment type, wherein each sub group is compiled of all pieces of equipment of that equipment type and modifying a user interface to show the sub groups through graphical images;
    assigning, by one or more processors, at least one parameter for each of the sub groups, wherein the at least one parameter is based on the equipment type and data which the equipment type can collect and is assigned to all of the pieces of equipment within that sub group;
    setting, by one or more processors, a range of values for the at least one parameter for each sub group;
    creating, by one or more processors, a set of graphical images for each equipment in the user interface to identify the settings of the equipment and a status of the equipment;
    receiving, by one or more processors, at least one value associated with the at least one piece of equipment of the at least one group of equipment;
    analyzing, by one or more processor, the received value to determine if the value is within the range and wherein it is determined that the value is outside the range manipulating, by one or more processors, a user interface with an alert of the received value is out of range; and
    generating, by one or more processors, a report of the equipment data in a user interface, wherein the report is interactive and graphics within the report are adjustable and modifiable.

2. The method for monitoring equipment data of claim 1, further comprising, sending, by one or more processors, an alert to predetermined personnel based on the out of range received value.

3. The method for monitoring equipment data of claim 1, wherein the alert is sent within a predetermined time period after the out of range value is received.

4. The method for monitoring equipment data of claim 1, further comprising, communicating, by one or more processors, to a sensor connected to a first group of the at least one pieces of equipment.

5. The method for monitoring equipment data of claim 4, wherein the communication with the sensor further comprises, transmitting, by one or more processors, data related to values collected by the sensor from the first group of the at least one pieces of equipment at a predetermined rate and quantity.

6. A computer program product for monitoring equipment data, the computer program product comprising:
    one or more computer readable storage media and program instructions stored on the one or more computer readable storage media, the program instructions comprising:
    program instructions to identify a group of data collecting devices;
    program instructions to connect the group of data collecting devices to a network, where data from the group of data collecting devices can be transferred to a central processing location;
    program instructions to separate-a group of data collecting devices into groups based on the data collecting devices types, wherein a user interface is manipulated to create the groups of data collecting devices by type;
    program instructions to assign at least one parameter for the group of data collecting devices wherein the parameter is specific to the data collecting device types, wherein the at least one parameter is applied to each of the data collecting devices in the group;
    program instructions to set a range of values for a first group of the at least one parameter; and program instructions to receive a first set of data associated with at least one piece of equipment of the group of data collecting devices where it is determined if the first set of data associated with at least one piece of equipment is outside of the range of values;

program instructions to manipulate the user interface associated with the data collecting device which is collecting data outside the range of value; and program instructions to generate an interactive and modifiable report within the user interface based on one selected parameter over a selected time frame.

7. The computer program product of claim 6, further comprising, program instructions to send an alert to predetermined personnel based on the out of range received value.

8. The computer program product of claim 7, wherein the alert is sent within a predetermined time period after the out of range value is received.

9. The computer program product of claim 6, further comprising, program instructions to communicate with a sensor connected to a first group of the group of data collecting devices.

10. The computer program product of claim 9, wherein the communication with the sensor further comprises, program instructions to transmit data from the first group of the group of data collecting devices at a predetermined rate and quantity.

11. A computer program product for monitoring equipment data, the computer program product comprising:

one or more computer processors, one or more computer readable storage media, and program instructions stored on the one or more computer readable storage media for execution by, at least one of the one or more processors, the program instructions comprising:

program instructions to identify a group of equipment, wherein the group of equipment are sorted by equipment type and the equipment type is based on data which can be collected by the equipment and how the equipment is able to collect the data;

program instructions to manipulate a user interface based on the sorted groups of the equipment;

program instructions to set at least one parameter for the group of equipment based on the equipment type, wherein the at least parameter are related to the data which the equipment is able to collect;

program instructions to set a range of acceptable values for the at least one parameters for the equipment;

program instructions to receive at least one value, wherein the received value is compared to the range of acceptable values; and program instructions to manipulate the user interface related to the piece of equipment and the value of the received data, wherein the user interface provides a graphical representation of the received data and a layout of the user interface is adjustable, interactive and modifiable by a user.

12. The computer program product of claim 11, further comprising, program instructions to identify if the at least one received value is associated with at least one piece of equipment within the first group of the at least one parameter, wherein if the at least one received value is not equal to or within the range of acceptable values the parameter is identified.

13. The computer program product of claim 12, further comprising, program instructions to send an alert to predetermined personnel based on the out of range received value.

14. The computer program product of claim 13, wherein the alert is sent within a predetermined time period after the out of range value is received.

15. The computer program product of claim 14, wherein the communication with the sensor further comprises, program instructions to transmit data from the first group of the at least one pieces of equipment at a predetermined rate and quantity.

16. The computer program product of claim 11, wherein the user interface is manipulated based on the amount of data received by the equipment based on the competition of the data collected compared to a base value.

17. The computer program product of claim 11, wherein reports can be electronically signed.

18. The computer program product of claim 11, wherein more than one of the graphical representations of the received data may be combined within the user interface to generate a novel graphical representation of a combined received data.

\* \* \* \* \*